United States Patent

Lenz

[11] Patent Number: 5,877,807
[45] Date of Patent: Mar. 2, 1999

[54] OPTOELECTRONIC COLORED IMAGE CONVERTER

[76] Inventor: Reimar Lenz, Hollandstr. 17, 8000 München 40, Germany

[21] Appl. No.: 921,700

[22] Filed: Sep. 2, 1997

Related U.S. Application Data

[63] Continuation of Ser. No. 352,686, Nov. 30, 1994, abandoned, which is a continuation of Ser. No. 57,056, May 5, 1993, abandoned, which is a continuation of Ser. No. 931,410, Aug. 24, 1992, abandoned, which is a continuation of Ser. No. 536,627, filed as PCT/DE89/00690, Oct. 26, 1989 published as WO90/5424, May 17, 1990, abandoned.

[30] Foreign Application Priority Data

Oct. 31, 1988 [DE] Germany ............ 38 37 063.8

[51] Int. Cl.$^6$ ............... H04N 5/225
[52] U.S. Cl. ............ 348/219; 348/218
[58] Field of Search ............. 348/207, 219, 348/208, 311, 316, 317, 272, 273, 276, 277, 278, 279, 280; H04N 5/225

[56] References Cited

U.S. PATENT DOCUMENTS

| | | |
|---|---|---|
| 4,453,177 | 6/1984 | Berger et al. . |
| 4,607,287 | 8/1986 | Endo et al. ............ 358/213.29 |
| 4,638,371 | 1/1987 | Milch . |
| 4,652,928 | 3/1987 | Endo et al. ............ 358/44 |
| 4,786,964 | 11/1988 | Plummer et al. . |
| 4,998,164 | 3/1991 | Endo et al. ............ 358/44 |
| 5,014,121 | 5/1991 | Hasegawa et al. ............ 358/55 |

FOREIGN PATENT DOCUMENTS

| | | |
|---|---|---|
| 0 063 061 | 10/1982 | European Pat. Off. . |
| 0 277 714 | 8/1988 | European Pat. Off. . |
| 23 55 38 | 6/1994 | Germany . |
| 58-056581 | 4/1983 | Japan . |
| 8600399 | 9/1986 | WIPO ............ H04N 1/18 |
| WO 86/05641 | 9/1986 | WIPO . |

*Primary Examiner*—Wendy Garber
*Assistant Examiner*—Tuan V. Ho
*Attorney, Agent, or Firm*—Evenson, McKeown, Edwards & Lenahan, P.L.L.C.

[57] ABSTRACT

An optoelectronic colored image converter having an imaging system, which images an object onto a two-dimensional CCD-array, the matrix of which, comprising light-sensitive sensor elements, has a color filter mask for picking up images with at least three color takes. The image is shifted relative to the CCD-array between taking consecutive frames in such a manner that the sensor elements of the CCD-array sensitive for the various colors come consecutively to rest on the same point of the image. A memory and control unit congruently composes the color takes of the frames picked up with the shifted CCD-array.

15 Claims, 5 Drawing Sheets

OPTOELECTRONIC COLORED IMAGE CONVERTER

This application is a continuation of application Ser. No. 08/352,686, filed on Nov. 30, 1994, now abandoned, which is a continuation of application Ser. No. 08/057,056, filed May 5, 1993, which is abandoned, which is a continuation of application Ser. No. 07/931,410, filed Aug. 24, 1992, which is abandoned, which is a continuation of application Ser. No. 07/536,627, filed Aug. 29, 1990 now abandoned, to enter the U.S. national phase of PCT/DE89/00690 filed on Oct. 26, 1989, published as WO90/5424, May 17, 1990 and is now abandoned.

BACKGROUND AND SUMMARY OF THE INVENTION

The present invention relates to an optoelectronic colored image converter having an imaging system which images an object into a two-dimensional CCD-array, the matrix of which being made of light-sensitive sensor elements is provided with a color filter mask for picking up images with at least three colored takes.

Optoelectronic colored image converters having a single CCD-array and color filter mask are commonly known. Compared to colored image converters operating with one CCD-array for each individual colored take, by way of illustration red, green and blue, they have the advantage of having less elaborate construction. The disadvantage, however, is that the number of light-sensitive elements at disposal for a colored take—depending on the design of the colored filter mask—is on the average less by the factor 3 than is the case with optoelectronic: colored image converters working with three CCD-arrays, that is with one per primary color. In addition to the thereby reduced picture resolution, it is also a disadvantage that the colored takes are created by scanning the image at adjacent, thus not congruent image scanning points. This can result, in particular, in the case of fine, periodical image structures in very disturbing color artifacts in the form of color patterns.

From WO 86/05641 and WO 86/05642, optoelectronic colored image converters of another class are known than that described thus far. These are colored image converters having three CCD-arrays in which the image is moved relative to the CCD-array a fraction of the distance between the sensor element (hereinafter referred to as SEL). This shifting takes place in order to raise the picture resolution measured in picture elements (PEL =picture element) over the resolution given by the SEL number.

An object of the present invention is to provide an optoelectronic colored image converter for raising the resolution and for preventing colored scanning artifacts (color aliasing) in a colored image converter having only one CCD-array and color filter matrix, a relative-shifting between the image and the CCD-array.

In accordance with the present invention it was understood that simply transferring the "Sub-Pixel-Relative-Shifting" known from WO 86/05641 or WO 86/05642 is not enough. Namely, in order to prevent color artifacts, shifting by integral multiples of the distance between the sensor elements is required.

By taking several, minimally staggered images (hereinafter referred to as frames) and subsequently superimposing the frames, a more highly resolved picture is yielded. The colored takes of the resulting picture have congruent scanning points in contrast to the colored takes of frames.

For this reason, an object of the present invention is to improve an optoelectronic colored image converter having a CCD-array and a color filter mask so that higher resolution is yielded compared to the number of the CCD-sensor elements (SEL) of the respective color, which meets the requirements of all the color takes at the same scanning points.

This and other objects are met by the present invention which provides an optoelectronic colored image converter having an imaging system, which images an object onto a two-dimensional CCD-array. The matrix of the CCD-array, having light sensitive elements, has a color filter mask for picking up images with at least three color takes. Means are provided for shifting the image relative to the CCD-array between taking consecutive frames in such a manner that the sensor elements of the CCD-array sensitive for the various colors come consecutively to rest on the same point of the image. A memory and control unit congruently composes the color takes of the frames picked up with the shifted CCD-array.

In accordance with the present invention it was understood that in order to raise the resolution of an optoelectronic colored image converter having only one image pick-up before which a color filter mask for taking at least three color takes, thus by way of illustration a red, a green and a blue take, is arranged, it is necessary to first attain by relative shifting between the image and the image pick-up that the sensor elements of the image pick-up sensitive to red, green and blue of the CCD-array come to rest on the same point of the image.

Accordingly, means are provided in an embodiment of the invention, to shift the CCD-array or an element in the beam path before the CCD-array. In this manner, first frames, by way of illustration comprising three color takes each, which have been shifted relative to one another by integral multiples of the SEL distance, are obtained. The number of image points of a frame equals the number of sensor elements of the CCD-array.

A memory and control unit, which intermediately stores the single frames, subsequently congruently composes the color takes of all the frames with the relative shifted CCD-array.

By means of this measure, which is an element of the present invention, due to the relative shifting by integral multiples of the SEL distance the "principle unsharpness" of an optoelectronic colored image converter is obviated, which occurs because the individual color take-pictures are picked up at "different image points". The elimination of this "principle unsharpness" is a prerequisite for sub-SEL shifting, i.e. a relative shifting between the image and the image pick-up by a fraction of the distance between the individual light-sensitive sensor elements. This sub-SEL shifting, in addition, permits raising the resolution continuously at this rate, the smaller the dimensions of the edges of the light-sensitive area of a sensor element relative to the distance between the single elements.

The shifting of the CCD-array has the advantage compared to shifting or tilting an element in the beam path for the CCD-array in that it is technically easier to realize. By way of illustration, piezoelements can be provided, which shift the CCD-array one or two-dimensionally in the plane of the image.

The previously mentioned "sub-SEL-shifting" described can also be utilized to obtain an assimilation of the image resolution when the distances between the sensor elements differ in perpendicular directions to one another.

Furthermore, it is advantageous that an embodiment of the present invention also permits scanning in a hexagonal pattern corresponding to the densest filling of an area.

In addition, the following advantages are attained by the small relative shifting of a CCD area sensor and subsequent composition of the frames provided for in accordance with the present invention.

Very high resolution of the entire picture of, by way of illustration 2000×1650 image elements, is obtained for all three color channels with the use of interline transfer color sensors, which in the case of the described embodiments has, by way of example, 250×550 SEL for the green channel and 250×275 SEL for the red and the blue channels and light-sensitive area elements having dimensions of 6×6 μm.

The modulation transfer function of the sensor has fallen to approximately 30% with this resolution, permitting in particular high-resolution scanning of a DIN A4 printed page, a color slide or a strip of film with a picture format of 24×18 mm.

Geometric precision is already very high in normal mechanical embodiments of the shifted elements as the shift paths are very short. In the aforementioned example, the size of the resolution cell in a color sensor is 34×44 μm, whereas in a corresponding B/W sensor it is 17×11 μm. A relative error of the mechanical shifting by, for example 1%, results in a maximum error of 0.44 μm (mechanical) plus 0.1 μm of the sensor in the entire image field. This is small compared to the radial lens distortion of CCTV lenses, which is, by way of illustration, already up to 50 μm at the edge of the picture in a lens with a focal distance of 25 mm.

Light-sensitivity is raised compared to line scanners or drum scanners by orders of magnitude so that the pick-up time is substantially shortened while having the same resolution and the same signal/noise ratio.

Having different shift patterns permits, within limits, choosing freely between high local resolution and high temporal resolution.

Furthermore, it is possible to scan the image not only in a rectangular, but also in an almost hexagonal raster, which is occasionally required, in particular, in medicine and in morphological image processing.

The selected detail of the picture can be monitored with a normal TV monitor in full temporal resolution and thus be sent without difficulty prior to the actual pick-up as the frames are the same size as the entire picture.

As the electric bandwidth of the frames at the output of the sensor corresponds to that of a TV picture, the frames can be first intermediately stored with conventional commercial video recorders and then later composed to an entire high-resolution picture by the computer, permitting using it in a portable electronic color camera having practically the resolution of a miniature camera slide and a memory capacity of more than a thousand single pictures. Magnetic band drop-outs can be easily detected by the computer due to the image-boxing and corrected without very visible losses (the principle of data-boxing or distribution).

Due to the short mechanical paths, no slide guides are needed, only bend guides. For the same reason piezoelectric positioning elements without backlash can be utilized, which can be directly electrically triggered and are mechanically very stable.

As the color mask can be attached directly onto the sensor, so-called color multiplex does not have to be generated like in the case of black-white sensors by the color filters having the size of the image field placed one behind the other in the beam path or by color separation with prisms onto three sensors, but simply occurs by shifting the sensor laterally. Chromatic aberrations or other impairments of the image from the filters are therefore obviated so that aberrations are only caused by the lens.

There is a cost-saving due to the use of mass-produced low resolution CCD area sensors, using the present invention.

There is a high resolution of, for example, 2000×1650 image elements, and with a reduction of the light-sensitivity of the area elements even more for each of the three color channels, that can be attained in embodiments of the present invention.

Light-sensitivity is approximately two orders of magnitude larger than that of cameras having a shifting line, which have comparable image resolution.

The precision of the position of the image scanning points is also approximately two orders of magnitude larger than that of such line cameras.

The costs of the colored image converter of the present invention are very low due to the use of only a single mass-produced consumer electronics sensor without any elaborate optics or expensive color filter.

In particular, the invention has some of the following uses.

The present invention can be used in data teletransmission, either B/W or color telefax. Data pick-up can occur in a shorter time and with lower demands on the power of the light source. Due to the use of area sensors, the original no longer needs to be shifted. For this reason, extremely high geometric precision in image pick-up can be guaranteed.

The present invention can also be used in film scanning for digital film reprocessing. In particular, when coloring, compensating for color errors or in the case of data input for "special effects", due to the great number of images to be picked up, short pick-up time is of special interest. Although flying spot scanners can attain the required resolution, they are very expensive due to the elaborate technology with three photomultipliers (several hundred thousand DM). Line cameras are less sensitive and due to the major mechanical shifting cause the image to flicker because of the geometric imprecisions.

The present invention can also be used in high-resolution data input of single images for commercial arts. Nearly all full page color advertising photographs in magazines are digitally improved prior to printing by raising edges, suppressing noise, increasing color saturation and contrast, and retouching.

The present invention can also be used in high-resolution data input for application in photometry. The use of digital image processing in photometry still suffers, in particular, from insufficient availability of geometrically highly precise and high-resolution scanning systems. The image converter of the present invention closes this gap.

The present invention can also be used for Image Scanning for Electronic Filing (Document Filing). With the available resolution, diapositives and dianegatives can be filed with almost no losses, which is of significance for setting up data banks in medicine for example.

The present invention can also be used in an Electronic Diapositive/negative Viewer. With the invented color image converter and a high-resolution monitor, diapositives and with digital matrixing also dianegatives can be viewed in high quality, which will gain in significance with the foreseeable establishment of HDTV standards. By employing two memories, pictures can be changed without interruption.

The present invention is also useful in Videometry. The availability of a high-precision scanning raster, which can be shifted fractions of the distance between the sensor elements, is of importance for measuring methods with image processing. This is, in particular, true for moire measuring with strip grids as the determination of the phase can occur separately for each image point directly by shifting the image point 120°.

The present invention can also be used with portable still cameras with slide quality. The availability of digital tape memories (digital audio tape on video tapes) with high recording density makes, due to the low weight and low required performance of a camera, a portable camera in accordance with the present invention conceivable, which permits storing several hundred pictures on a very inexpensive carrier. Simultaneously, this, permits the "videography" of buildings and excavation pieces in archaeology for measuring purposes as recording occurs with extremely high geometric precision.

Other objects, advantages and novel features of the present invention will become apparent from the following detailed description of the invention when considered in conjunction with, the accompanying drawings.

DETAILED DESCRIPTION OF THE DRAWINGS

In the embodiment of the present invention described in the following, a so-called interline transfer CCD area sensor is employed without the intention of limiting the overall scope and spirit of the inventive concept. The present invention can be utilized with other area sensors operating in accordance with the frame transfer principle and in accordance with other principles as long as they only permit a respective image representation.

These two cited types of sensors differ with regard to the invented application in that, in the frame transfer sensor, practically the entire area within a sensor is light-sensitive, whereas in the interline transfer sensor, only a small area element is light-sensitive. Usually, in the interline transfer sensors, the portion of the light-sensitive area is less than 25%, which permits a considerable increase in image resolution by sub-SEL shifting.

In the illustrated embodiment of the present invention, an interline transfer area sensor having a TV image rate is employed, in which the spectral resolution required for colored images is obtained at the expense of pinpoint resolution in that every color take is collocated to only a fraction of the entire sensor elements at disposal.

Figure 1A:
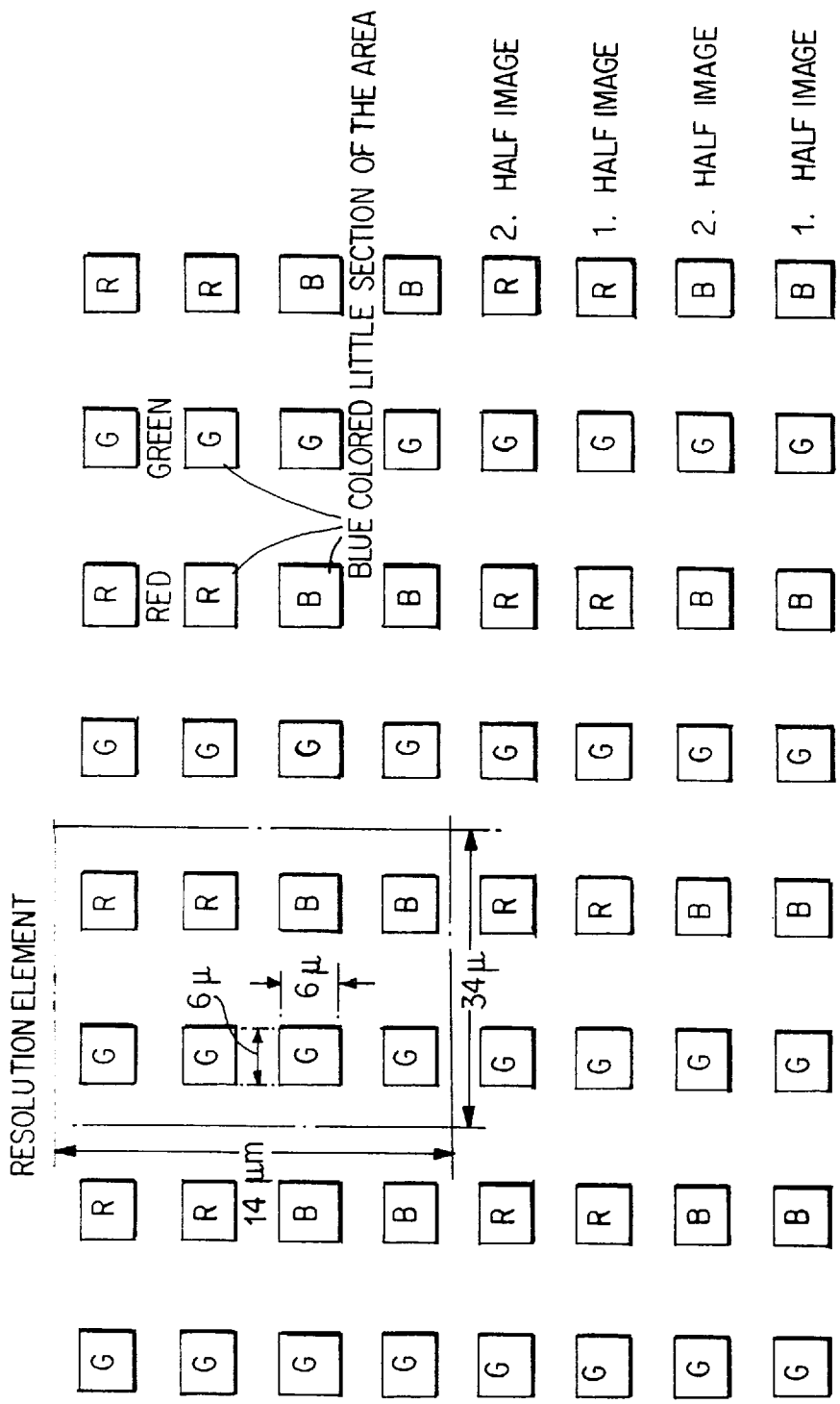
FIG. 1a shows the sensor elements and their coloring (R, G, B) of a prior art colored image converter.

FIG. 1a schematically depicts a detail of an interline-transfer CCD area sensor, in which the light-sensitive areas of the individual sensor elements are drawn as squares. The individual sensor elements are sensitive to red, green and blue to the color filter mask attached to the CCD-array. This is symbolized by the designations R, G and B.

FIG. 1a shows not only the dimensions of the edges of the light-sensitive area elements, but also those of the resolution element, which correspond to the smallest periodically repeated structure of the color filter mask.

In accordance with the present invention, by means of a small two-dimensional relative shift between the sensor and the image, which can, by way of illustration without the intention of limiting the scope and spirit of the overall inventive concept, be achieved by shifting the sensor, high local resolution can be attained by reducing the temporal resolution as several frames are taken consecutively.

By means of varying shift patterns having different numbers of frames, the temporal and local resolution can be freely exchanged within limits. The maximum temporal resolution corresponds to the readout time of a frame and is therefore, by way of illustration, determined by the television image rate, the maximum local resolution by the lens used and by the dimensions of the light-sensitive area element within a sensor cell. In the case of dimensions 6×6 $\mu$m shown by way of example in FIG. 1a, the first zero of the modulation-transfer function is at 167 pairs of lines per millimeter.

Figure 1B:
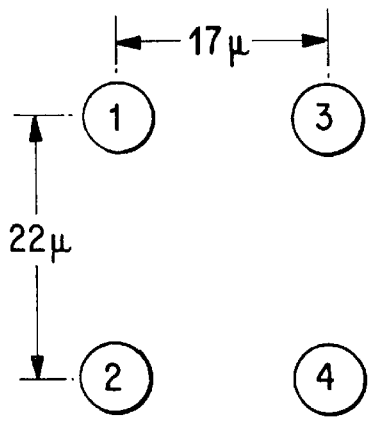
FIG. 1b shows the four sensor positions, shifted by integral multiples of the SEL-distance, to be taken in an embodiment of the present invention in order to avoid color artifacts.

FIG. 1b shows the positioning scheme of the sensor relative to the image for generating congruent color takes having the respective resolution of the corresponding sensor in a black/white version. The single positions are numbered consecutively from 1 to 4 and correspond to a relative shift by one SEL distance in the horizontal direction and by two SEL distances in the vertical direction.

Figure 1C:
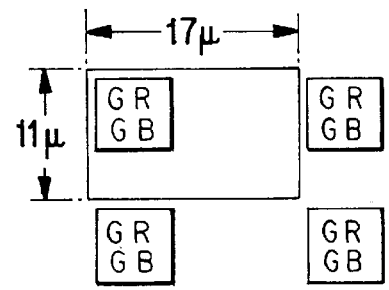
FIG. 1c shows the resolution element resulting front superimposing the obtained frames, with congruent scanning points for the red, green and blue color takes.

FIG. 1c shows the resolution element of the resulting image yielded by the overlapping of four frames. The most important color take green for the luminance information is represented twice at each scanning point, a result of the color mask of the illustrated embodiment, which is only shows here as an example. The color mask provides for more green-sensitive than red or blue-sensitive sensor elements.

As can be seen from FIGS. 1a and 1c, the resolution element has, due to the relative shift by integral multiples of the SEL distance in the horizontal direction, only half as large and in the vertical direction even only a quarter as large dimensions as during image pick-up, in which the image and the sensor are stationary to one another. At the same time, the color takes are obtained at the same scanning points and in this way possible color artifacts are avoided.

Figure 2A:
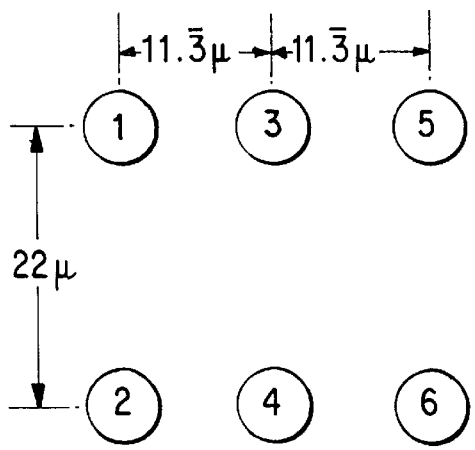
FIG. 2a to 2d show the positioning scheme for producing color takes having practically the same resolution in the x- and y-direction and only partially avoiding color artifacts.

FIG. 2a shows a positioning scheme for the relative shift, with which color takes are obtained, which have practically the same resolution in the horizontal as in the vertical direction. The shift in the vertical direction has again twice the SEL, distance, in the horizontal direction, but has however, integral multiples of ⅔ of the SEL distance.

Figure 2B:
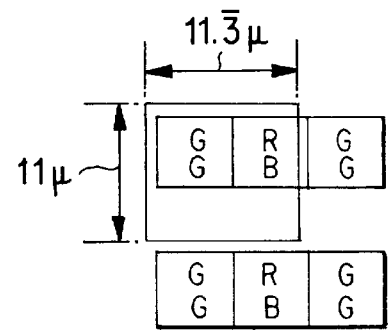

FIG. 2b shows the dimensions of the corresponding resolution element. In this case the red and the blue color takes are staggered in relation to the green color take and therefore the color artifacts are only partially suppressed, namely in the vertical direction.

Figure 2C:
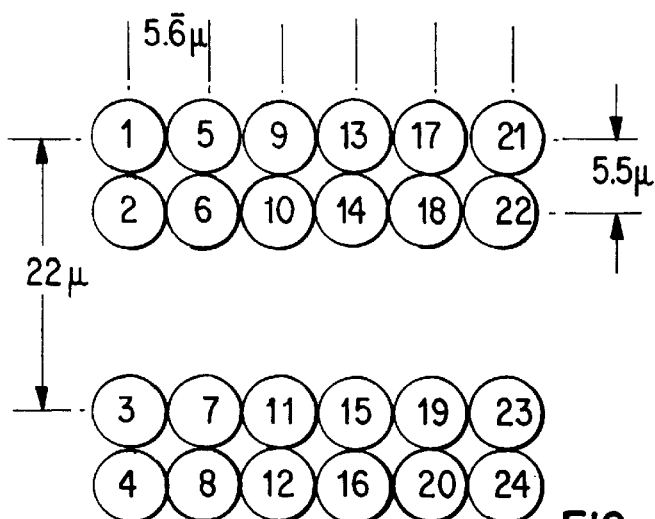

FIG. 2c shows a positioning scheme, with which high resolution and congruent color takes are obtained, which have practically the same resolution in both the horizontal and the vertical direction.

Figure 2D:
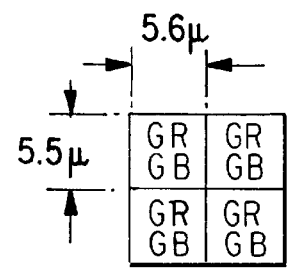

FIG. 2d shows the dimensions of the corresponding resolution element. In this case the red and the blue takes are congruent with the green take.

Figure 3A:
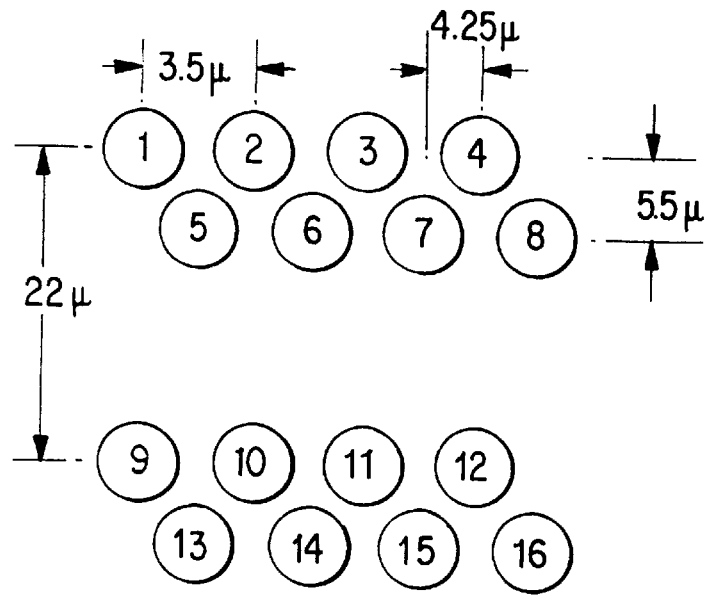
FIG. 3a to 3d show the positioning scheme for producing congruent color takes having a practically hexagonal scanning raster.

FIG. 3a shows a positioning scheme with which congruent color takes having a practically hexagonal scanning raster are obtained.

Figure 3B:
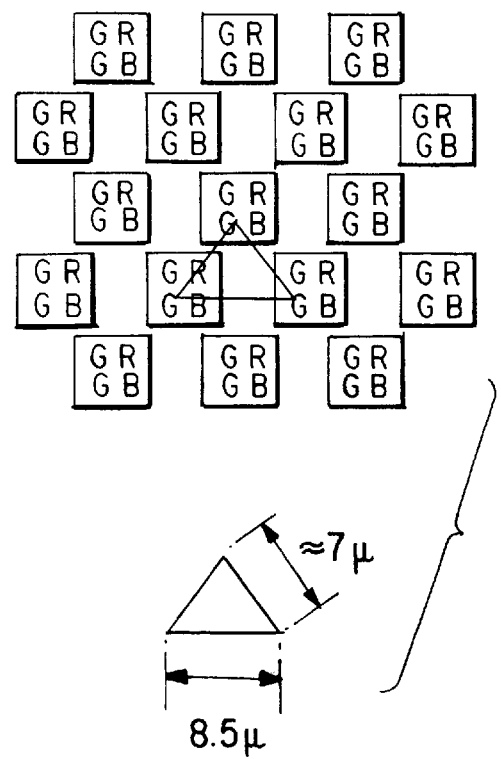

FIG. 3b shows the dimensions of the corresponding resolution element. The periodical continuation of the resolution element occurs here along three axes at an angle of ≈60° to one another, the vertical axis being one of the main axes.

Figure 3C:
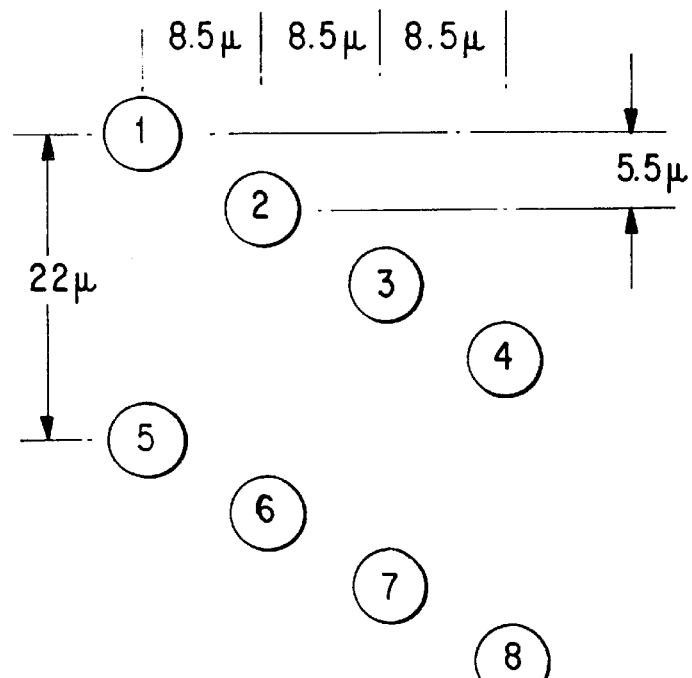

FIG. 3c shows a positioning scheme, with which high resolution and congruent color takes with a practically hexagonal scanning raster are obtained.

Figure 3D:
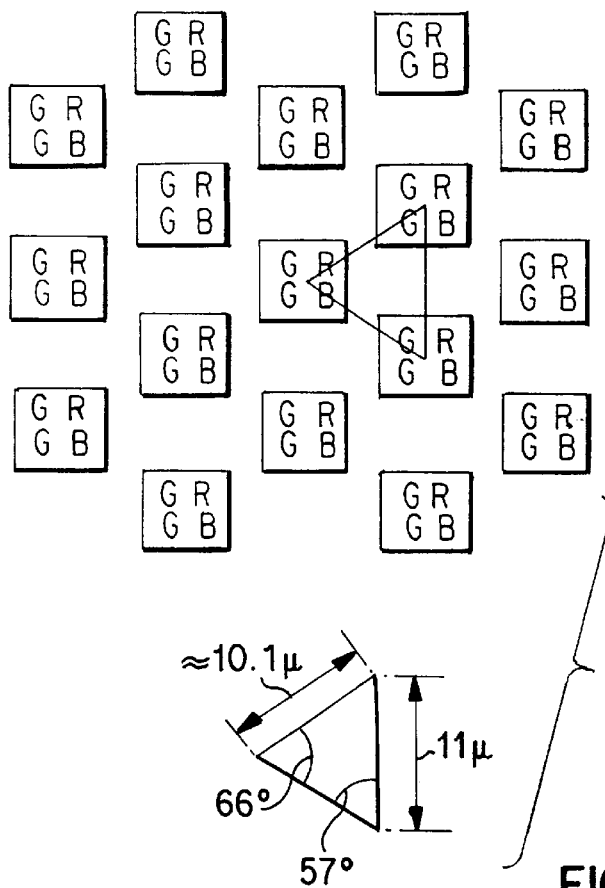

FIG. 3d shows the dimensions of the corresponding resolution element. The horizontal axis is now one of the main axes.

Figure 4:
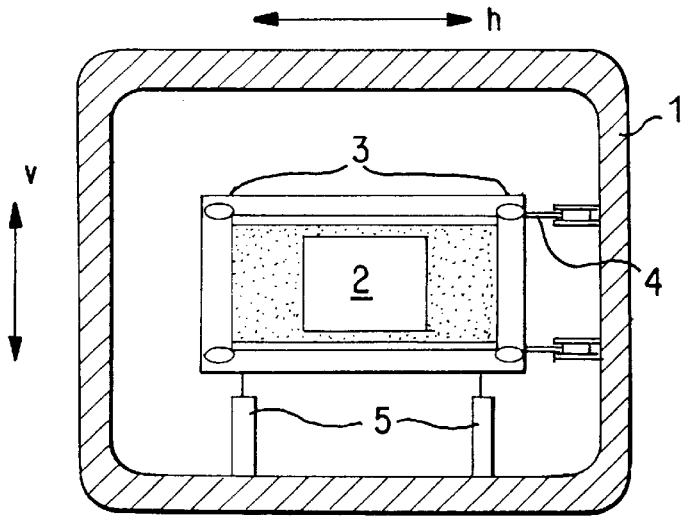
FIG. 4 shows an embodiment of a shiftable CCD-sensor according to the present invention.

FIG. 4 shows an embodiment of a sensor, which can be shifted relative to the image. Within a housing 1 a sensor 2 is attached on a base element 3, which can be moved by means of the leaf spring 4 and piezo-positioning elements 5 in the direction of arrows v and h.

Figure 5:
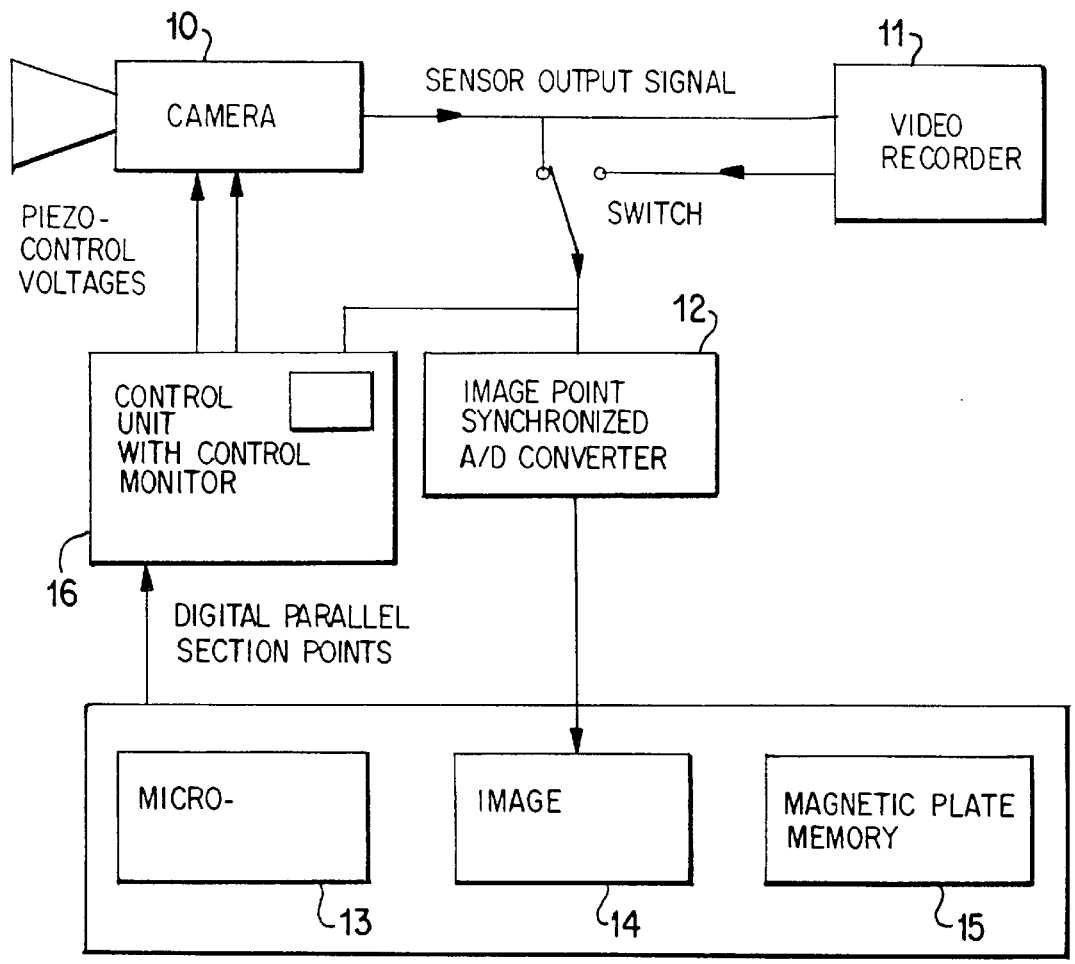
FIG. 5 shows a block diagram of the entire system constructed in accordance with an embodiment of the present invention.

FIG. 5 shows a block diagram of an embodiment according to the present invention of the control unit. With reference to the circuit elements indicated in this figure, the manner of function of the invented color image converter will be made more apparent in the following.

The image of the original is imaged sharply focused with a lens onto the CCD sensor (the camera 10). The description relates to the event that a color picture with a resolution of, by way of illustration 1500×1100 image elements per color take, is to be obtained. The CCD array equipped with a color mask according to FIG. 1a has 500 sensor elements in the horizontal and 550 SEL in the vertical direction. The positioning scheme required corresponds to the 24 positions to be taken up in FIG. 2c.

In position "1" the photons coming into the sensor elements within a certain period of integration are first converted into photo electrons and integrated in the loading condensers under the light-sensitive areas into charge packets. During the vertical image scanning gaps, the frame charges are transferred to the transport condensers of the vertical CCD bucket chains located beside the small light-sensitive sections of the area and ready for readout. In order to give the shift mechanics as much time as possible to stabilize, the computer 13 already gives the command through a control unit 16 to the next position "2" now, in which the light-sensitive areas element come to rest in the new image scanning points. Frames originating during motion and therefore blurred thereby, are not evaluated. The readout of the charges begins toward the end of the vertical scanning gap. The analog output signal from the sensor (camera 10) is digitized synchronously by an A/D converter 12 to its CCD readout rhythm (fast A/D conversion into, e.g. 8 bits=1 byte per sensor element) and filed in a fast memory (or image memory) 14. After ending the transfer of the frame from position "1" to a mass memory (e.g., a magnetic plate memory) 15, the readout of the frame from position "2" starts. In the preceding vertical scanning gap, the command from computer to transfer to position "3" has already been given. This procedure is repeated until all 24 frames are stored. If storing is fast enough, i.e. the evaluation of every second frame and European TV standard (25 Hz=¼ ms), the entire process takes 24×2×40 ms≈2 sec. During this time, the object to be imaged must not move. Afterwards the high-resolution picture is composed of the single frames with the aid of the computer 13.

In the event of analog intermediate storing on video tape by a video recorder 11, the sensor 10 is moved in the same manner. When subsequently reading into the computer 13, a time-base correction might be necessary in digitizing the frames due to the flutter and flow of the drive and errors due to drop-outs must be detected and corrected.

What is claimed:

1. An optoelectronic -image converter apparatus for obtaining a color still picture of an object, comprising:
    a) an optical projection system for forming a projection image of said object, said projection image having a plurality of imaginary pixel sites;
    b) a two-dimensional CCD-array having a plurality of light sensitive pixel sensor elements;
    c) a color mosaic filter having at least three groups of different filter elements, each group belonging to a different color and each filter element being associated with one pixel sensor element of said CCD-array;
    d) means for successively exposing said CCD-array to said projection image and forming at least three sets of output signals during each such exposing step, each set of output signals belonging to one specific color;
    e) means for successively shifting the projection image relative to said CCD-array in such a manner that at least one filter element of each of said at least three groups of different filter elements comes consecutively to rest on each of the imaginary pixel sites of said projection image so that at each of the imaginary pixel sites at least three different colors are captured;
    f) a storage and control unit for storing the output signals obtained at each exposing step from said CCD-array and for combining those output signals, which were obtained for each one specific imaginary pixel site of the projection image, thereby obtaining the color still picture.

2. The apparatus according to claim 1, wherein said CCD-array is shiftable.

3. The apparatus according to claim 2, wherein said CCD-array is shiftable two-dimensionally in a plane of the projection image.

4. The apparatus according to claim 3, wherein the means for successively shifting include piezopositioning elements which shift said CCD-array.

5. The apparatus according to claim 4, further comprising means for increasing the resolution of the color still picture by additionally shifting the projection image relative to said CCD-array by fractions of a distance between said pixel sensor elements between successive exposing steps.

6. The apparatus according to claim 5, wherein by said additional shifting an assimilation of the image resolution occurs in directions perpendicular to each other.

7. The apparatus according to claim 5, wherein said means for successively shifting comprise means for shifting in a hexagonal pattern to scan said projection image.

8. The apparatus according to claim 1, wherein said CCD-array is shiftable two-dimensionally in a plane of the image.

9. The apparatus according to claim 1, wherein the means for successively shifting include piezopositioning elements which shift said CCD-array.

10. The apparatus according to claim 1, further comprising means for increasing the resolution by additionally shifting the image relative to said CCD-array by fractions of a distance between said pixel sensor elements between successive exposing steps.

11. The apparatus according to claim 1, wherein said means for successively shifting comprise means for shifting in a hexagonal pattern to scan said projection image.

12. A method for obtaining a color still picture of an object, comprising the acts of:

forming a projection image of said object, said projection image having a plurality of imaginary pixel sites;

successively exposing a two-dimensional CCD-array having a plurality of light sensitive pixel sensor elements to said projection image;

forming at least three sets of output signals during each such exposing step, each set of output signals belonging to one specific color;

successively shifting the projection image relative to said CCD-array in such a manner that at least one filter element of each of at least three groups of different filter elements of a color mosaic filter comes consecutively to rest on each of the imaginary pixel sites of said projection image, each group of different filter elements belonging to a different color and each filter element being associated with one pixel sensor element of said CCD-array, wherein at each of the imaging pixel sites at least three different colors are captured;

storing output signals obtained at each exposing step from said CCD-array; and combining those output signals, which were obtained for each one specific imaginary pixel site of the projection image, thereby obtaining the color still picture.

13. The method according to claim 12, wherein the act of successively shifting the projection image relative to the CCD-array includes the act of two-dimensionally shifting the CCD-array in a plane of the projection image.

14. The method according to claim 12, further comprising the act of additionally shifting the projection image relative to said CCD-array by fractions of a distance between said pixel sensor elements between successive exposing steps to increase the resolution of the color still picture.

15. The method according to claim 12, wherein the act of successively shifting includes the act of shifting the projection image relative to the CCD-array in a hexagonal pattern to scan said projection image.

* * * * *